Nov. 26, 1946.   M. SCHIEBENDREIN   2,411,812
SEED ASPIRATOR FEEDER AND CLASSIFIER
Filed March 8, 1944   3 Sheets-Sheet 1

INVENTOR:
Mathew Schiebendrein
BY Harry A. Benner
ATTORNEY

Patented Nov. 26, 1946

2,411,812

UNITED STATES PATENT OFFICE 2,411,812

SEED ASPIRATOR FEEDER AND CLASSIFIER

Mathew Schiebendrein, St. Charles, Mo.

Application March 8, 1944, Serial No. 525,521

3 Claims. (Cl. 209—146)

My invention has relation to improvements in seed aspirators and it consists in the novel features of construction more fully set forth in the specification and pointed out in the claims.

The object of the invention is to grade seed according to weight by causing the seed to be subjected to the action of an air aspirator whereby the seed is carried along by the air column a distance inversely in proportion to its weight and permitted to discharge into a succession of hoppers.

Figures 1, 2:
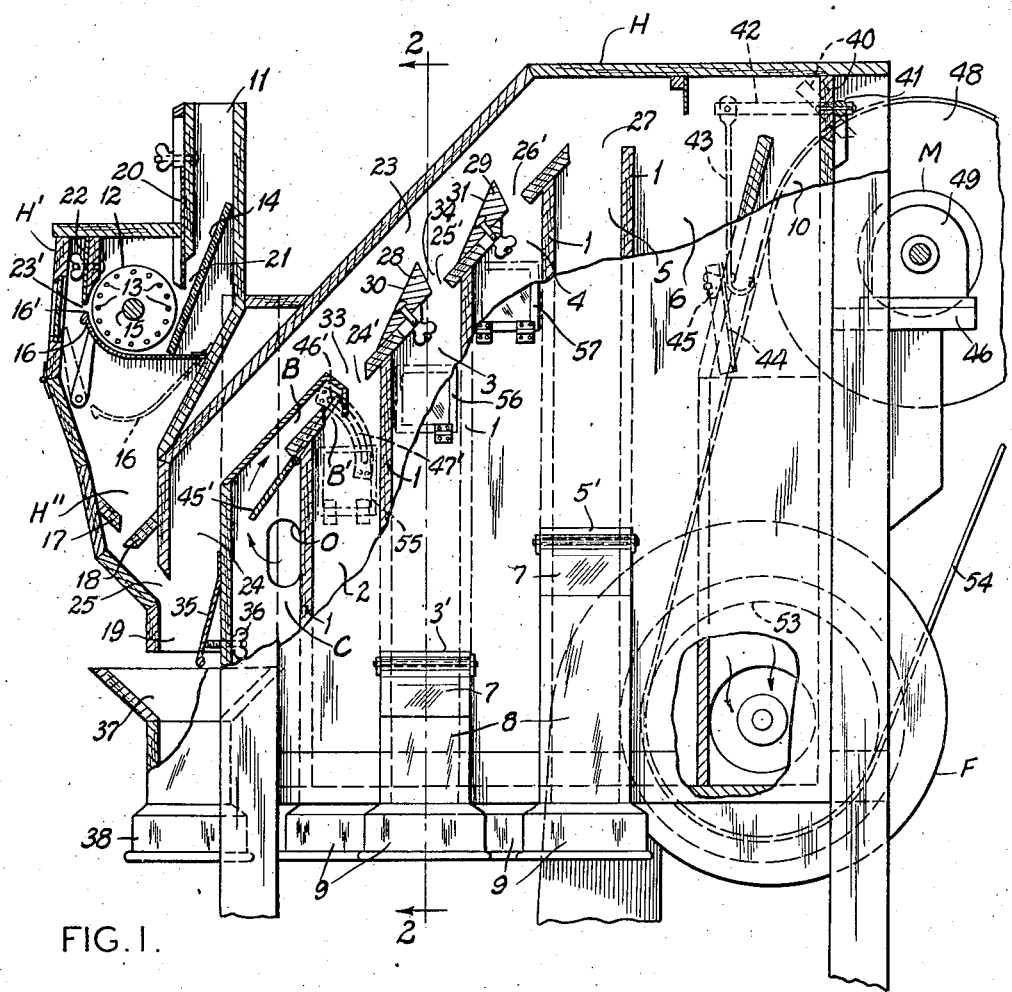
Figure 3:
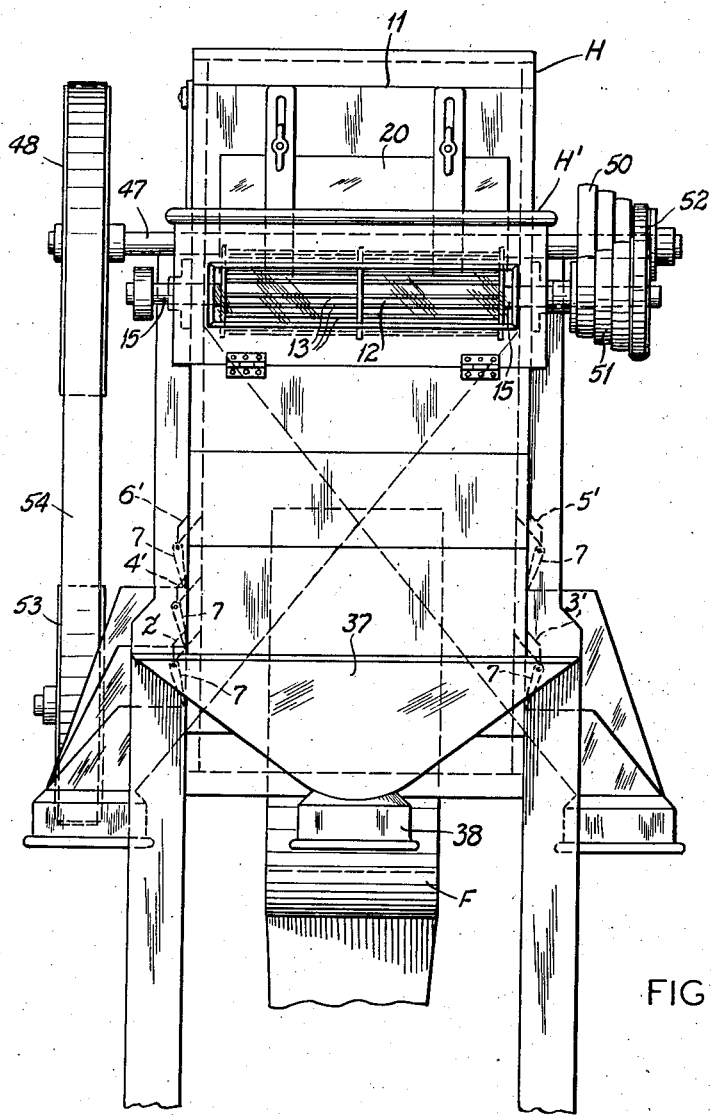
Figure 4:
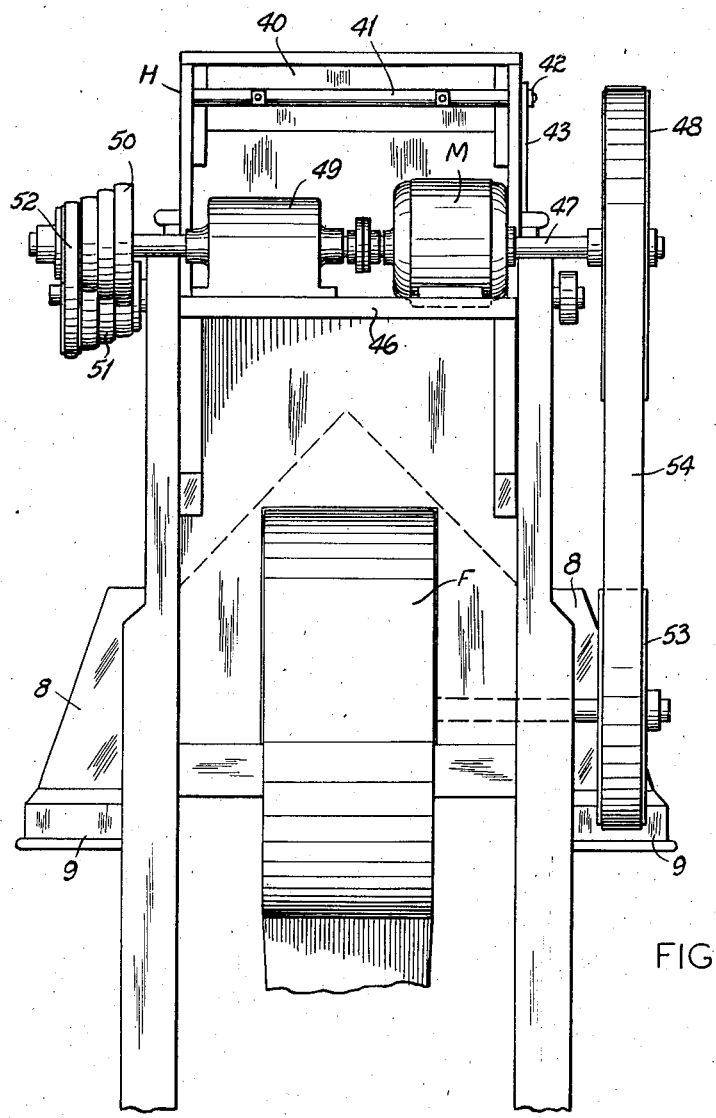

The manner in which this is accomplished will be readily apparent from a detailed description of the invention in connection with the accompanying drawings, in which:

Figure 1 is a combined side elevation and longitudinal section; Fig. 2 is a vertical section on the line 2—2 through the lower part of one of the seed hoppers; Fig. 3 is a front elevation of the invention; and Fig. 4 is a rear elevation thereof.

Referring to the drawings, H is a housing divided by partitions 1, 1 which divides the housing into hopper compartments 2, 3, 4, 5 and 6 for receiving the seed graded by weights as will be more clearly brought out hereinafter. Each of the compartments 2 to 6 inclusive is provided with a discharge spout 2′, 3′, etc., adapted to be closed by a flap valve 7, suspended at the upper edge of the spout over a chute 8 open at the top and having a flanged neck 9 at the bottom to receive a sack (not shown) in which the seed is discharged.

The compartments 2 to 6 inclusive are successively arranged towards the rear of the housing H and adjacent to compartment 6 there is a compartment 10 for receiving the lightest of the particles carried through the housing such as dust, chaff, etc., which pass in to a centrifugal fan F connected to compartment 10. An outlet pipe is connected to the fan F and leads in any desirable manner into the atmosphere.

A second housing H′ is mounted at the front of housing H and has an intake spout 11 located slightly to the rear of a seed agitator 12 which comprises a plurality of rods 13, arranged cylindrically for the purpose of feeding the seed forwardly from the inclined bottom 14 of spout 11.

The agitator 12 is mounted on a shaft 15 which is adapted to be rotated in a clockwise direction at a speed of about 4 R. P. M. to advance the seed over an apron 16 beneath the seed agitator 12 and encompassing the same for slightly less than 90°. The seed will be lifted by the action of the rods 13 over the discharge lip 16′ of apron 16 and allowed to fall through hopper housing H′ into hopper H″ over the baffles 17, 18 and thence into discharge spout 19 into the open bottom of which there is a constant flow of air superinduced by the action of the fan F, as will be more clearly apparent in the description to follow. The inclined bottom 14 of the spout 11 is preferably of glass, or some other highly polished material, so as to offer a minimum of resistance to the material flowing over it and insure a steady, uniform flow of material to the agitator 12.

It will be observed that there is a gate 20 disposed in front of the inclined bottom 14 of hopper 11 which is mounted for vertical adjustment so as to control the size of the throat 21 through which the seed discharges to the agitator 12. There is also a gate 22 mounted immediately in front of the agitator 12 and above the lip 16′ of apron 16, whereby the opening 23 through which the seed enters housing H′ may also be controlled. Thus the rapidity of the feed both to and from agitator 12 may be regulated to harmonize with the rapidity of the segregating of the seed and the subsequent grading operation.

The front of hopper H′ has a hinged door D that may be dropped in order to have access to the interior of the hopper to clean the same. In the cleaning operation the apron 16 is dropped to its dotted position (Fig. 1) by moving the prop p forwardly, as shown dotted.

Above hoppers 2 to 5 inclusive there is a flue 23, having an intake 24 immediately adjacent to hopper H″ and in communication therewith by a passageway 25 within the hopper H″. The flue 23 is connected to hopper compartments 2 to 5 inclusive by passageways 24, 25, 26 and 27, and immediately above the passageways 24 and 25 are blocks 28 and 29 respectively. The blocks 28 and 29 are slidingly mounted to and from passageways 24 and 25 and have inclined upper surfaces 30 and 31 so as to provide suitable seed receiving valleys 33 and 34.

The opening through the discharge spout 19 is controlled by a spring gate 35 which may be deflected by a thumb screw 36, so as to vary the opening through the spout. The seed that falls through the spout 19 enters a hopper 37, terminating in a flanged collar 38, which may be connected with a sack for receiving seed.

At the top of the back wall 39 of housing H is a damper 40, rotatively mounted on a shaft 41 whereby it may be opened and closed as desired by means of connecting links 42 and 43, the latter having its lower end connected to a slotted angle plate 44 by means of a thumb screw 45, whereby it may be clamped in whatever position is necessary to give the desired draft through the housing H.

Between passageway 24 and hopper compartment 2 is an air compartment C having openings O, O, on each side thereof to admit air to the compartment C and to a by-pass B discharge through an opening B' into compartment 2.

The entrance to by-pass B is controlled by a gate valve 45' which may be adjusted to restrain the entrance to the by-pass B by means of a lever connection 46' with a slotted bracket 47', the latter being mounted on the outer wall of housing H.

By referring to Figures 3 and 4 it will be seen that a motor M is mounted on a platform 46 at the rear of housing H; said motor having a shaft 47 carrying a pulley 48 on one end and connected to suitable reducing gear 49 on the other, whereby pulley 48 is driven at a comparatively high speed while step pulley 50 connected to reducing gear 49 is driven at comparatively slow speed. Step pulley 50 is connected to pulley 51 by a belt 52; the pulley 51 being mounted on shaft 15 which carries the seed agitator 12. Pulley 48 actuates fan pulley 53 by means of a belt 54.

It will be noticed that in the sides of housing H there are observation windows 55, 56 and 57, through which the discharge of the seed into the receiving hoppers may be observed, with a view to making any adjustments that may be necessary to obtain proper grading of the seed.

The operation of the invention is obvious from the foregoing description but may be briefly set forth as follows:

As the seed is received from the farm it is fed in any desirable manner into the spout 11, whence it enters hopper H' and is slowly fed over the lip 16' of apron 16 in to hopper H''. As the seed leaves the hopper H'' it encounters the upward moving current of air passing through the flue 23, so that only the heaviest seed will fall through this air stream into hopper 37. The seed that is carried into the flue 23 first enters the valley 33 where the next heaviest seed will be deposited to fall into hopper 2, whence the seed moving on successively encounters valleys 25 and 26 and the open top of hoppers 5 and 6. Obviously seed carried over to hopper 6 would be the lightest weight of seed, while any substances carried beyond the hopper 6 will be impurities and chaff to be sucked out of the housing H by the action of the fan F.

By the action of my improved seed aspirator the seed is very accurately graded by weight, so that the seed company may pack the respective grades into sacks according to grade. The seed is also thoroughly cleaned by the action of the air current passing through the flue; the said air current carrying with it all dust particles and chaff mixed with the seed as is initially charged into the apparatus.

Having described my invention, I claim:

1. In a seed grading machine that has a seed classifying housing, a feed hopper having a discharge outlet open to atmosphere and a passage in communication with said housing, said hopper including a substantially closed chamber having an inlet spout extending therefrom and being open to atmosphere, said spout having a vertically inclined wall at its lower end that supports the seed and permits unimpeded movement of the seed into said chamber, a gate extending from said spout to a point adjacent to but spaced from said inclined wall to form with said wall an orifice through which the seed can pass into said chamber, said chamber having an outlet in the side wall thereof opposite to said orifice, and an agitating squirrel cage feed rotor in said chamber between the orifice and chamber outlet and having its surface lying closely adjacent to the inclined wall and bottom of the chamber, said rotor rotating in the direction of flow of the seed through said orifice and toward said chamber outlet, and a fan in said classifying housing drawing air through said discharge outlet of the hopper, across said passage and into the classifying housing.

2. In a seed grading machine that has a seed classifying housing, a feed hopper having a discharge outlet open to atmosphere and a passage in communication with said housing, said hopper including a substantially closed chamber having an inlet spout extending therefrom and being open to atmosphere, said spout having a vertically inclined wall at its lower end that supports the seed and permits unimpeded movement of the seed into said chamber, a gate extending from said spout to a point adjacent to but spaced from said inclined wall to form with said wall an orifice through which the seed can pass into said chamber, said chamber having an outlet in the side wall thereof opposite to said orifice and having a bottom which has a curved portion that extends up to said outlet, and an agitating squirrel cage feed rotor in said chamber between the orifice and chamber outlet and having its surface lying closely adjacent to the inclined wall and the curved portion of the bottom of the chamber, said rotor rotating in the direction of flow of the seed through said orifice and toward said chamber outlet, and a fan in said classifying housing drawing air through said discharge outlet of the hopper, across said passage and into the classifying housing.

3. In a seed grading machine that has a seed classifying housing, a feed hopper having a discharge outlet open to atmosphere and a passage in communication with said housing, said hopper including a substantially closed chamber having an inlet spout extending therefrom and being open to atmosphere, said spout having a vertically inclined wall at its lower end that supports the seed and permits unimpeded movement of the seed into said chamber, a gate extending from said spout to a point adjacent to but spaced from said inclined wall to form with said wall an orifice through which the seed can pass into said chamber, said chamber having a gate that is spaced from the bottom of the chamber and cooperates with the bottom of the chamber to provide an outlet in the side wall of the chamber opposite to said orifice, and an agitating squirrel cage feed rotor in said chamber between the orifice and chamber outlet and having its surface lying closely adjacent to the inclined wall and bottom of the chamber, said rotor rotating in the direction of flow of the seed through said orifice and toward said chamber outlet, and a fan in said classifying housing drawing air through said discharge outlet of the hopper, across said passage and into the classifying housing.

MATHEW SCHIEBENDREIN.